June 18, 1968     R. H. RILEY, JR., ET AL     3,388,728
PORTABLE POWER TOOLS
Filed April 15, 1966     4 Sheets-Sheet 1
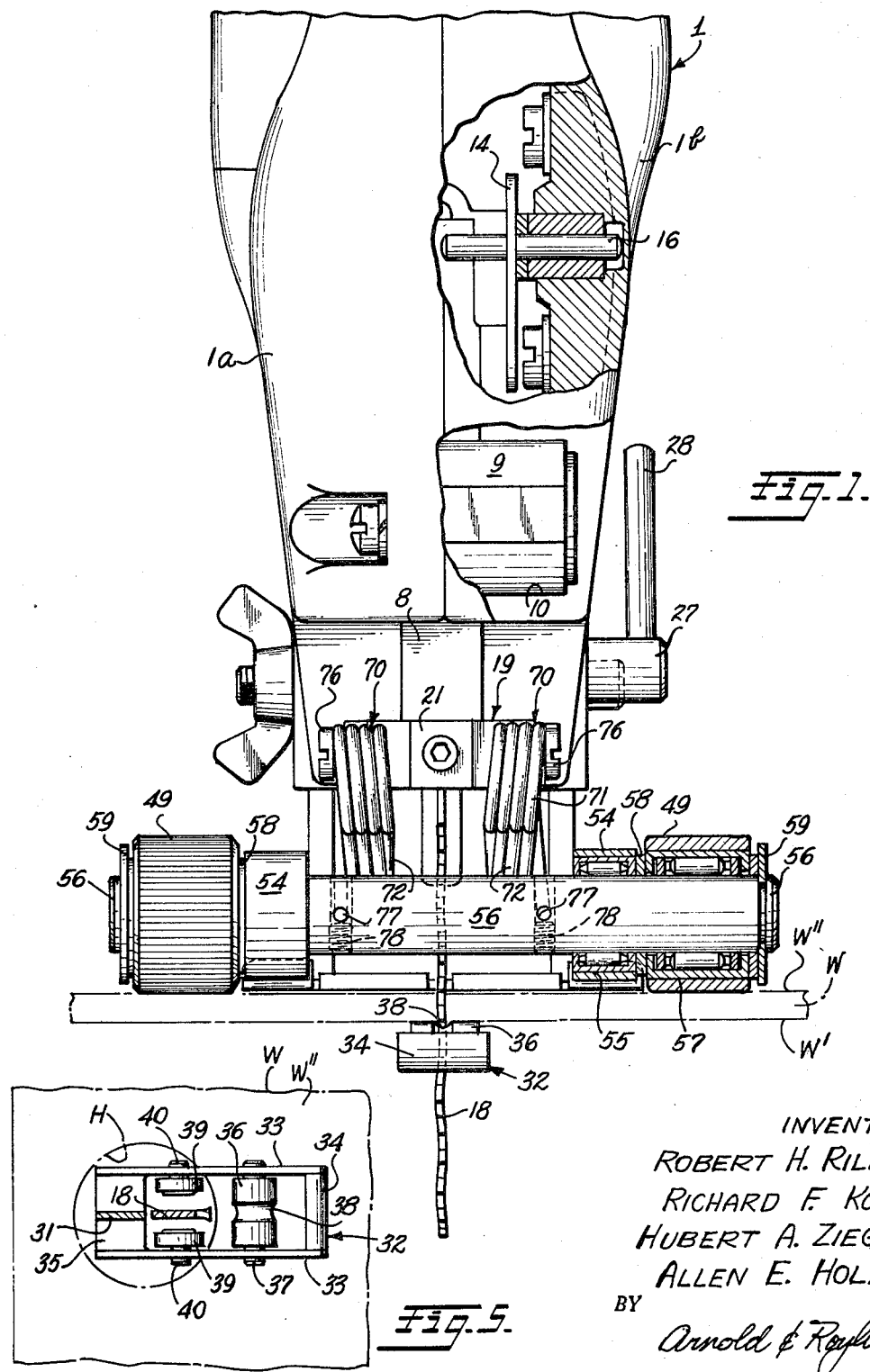
INVENTORS
ROBERT H. RILEY, JR.
RICHARD F. KOEN
HUBERT A. ZIEGLER
ALLEN E. HOLMES
BY
Arnold & Roylance
ATTORNEYS

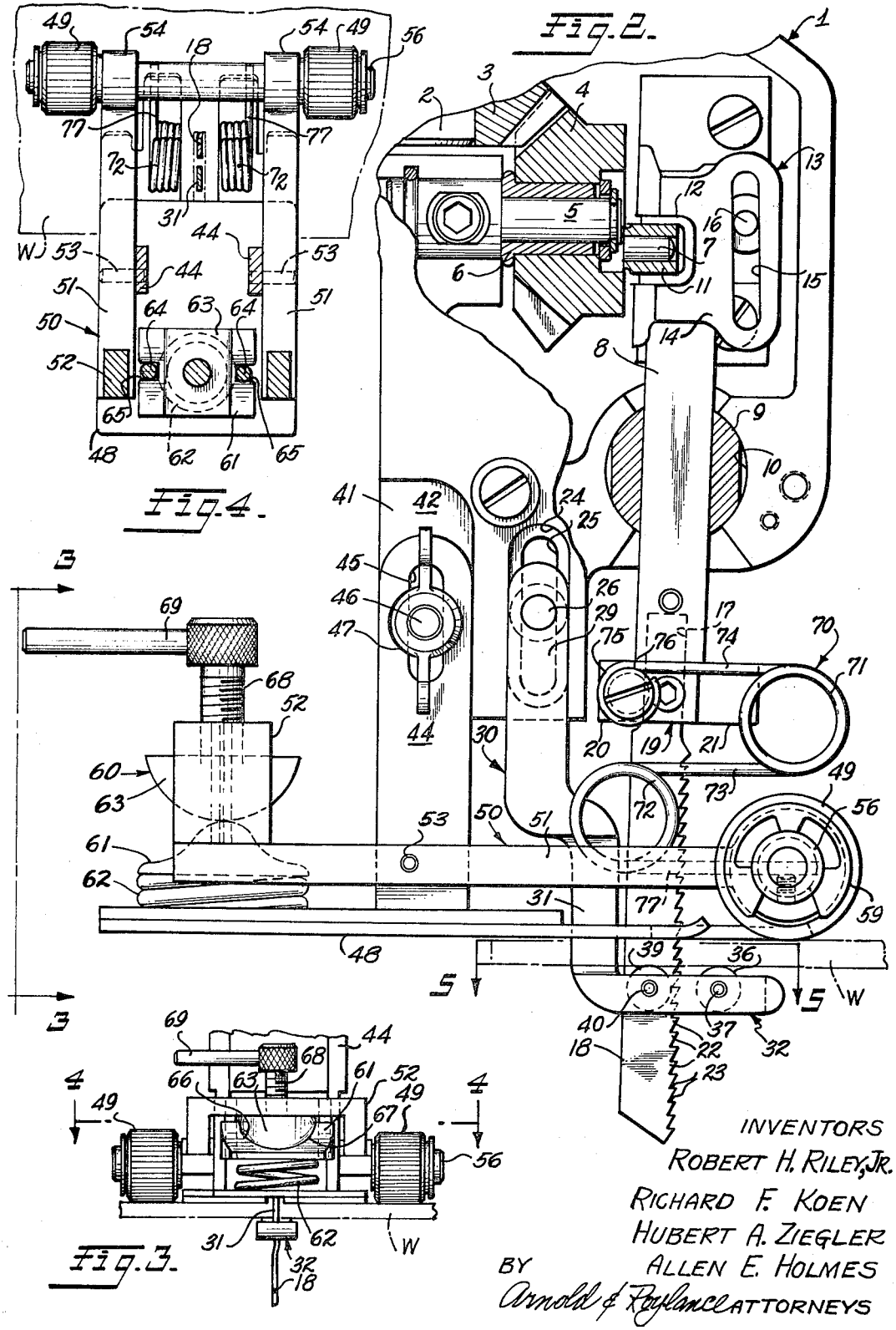

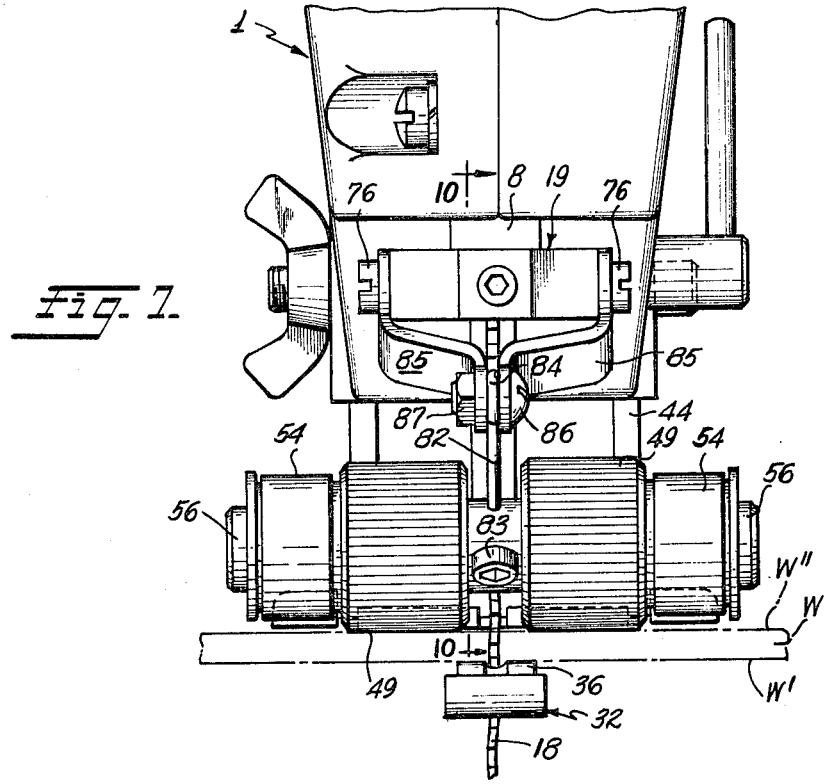
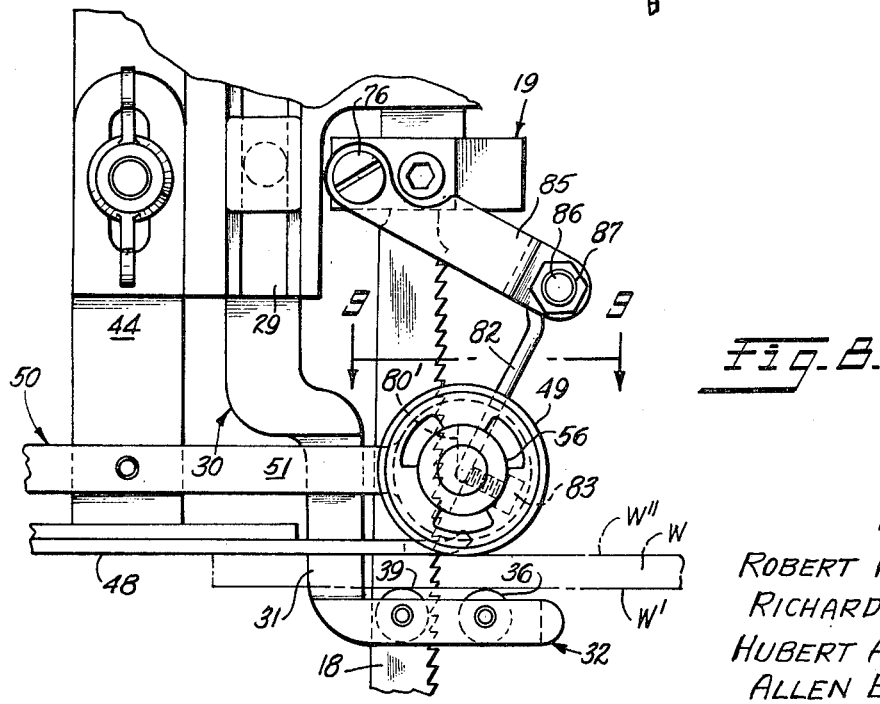

June 18, 1968   R. H. RILEY, JR., ET AL   3,388,728
PORTABLE POWER TOOLS
Filed April 15, 1966   4 Sheets-Sheet 4
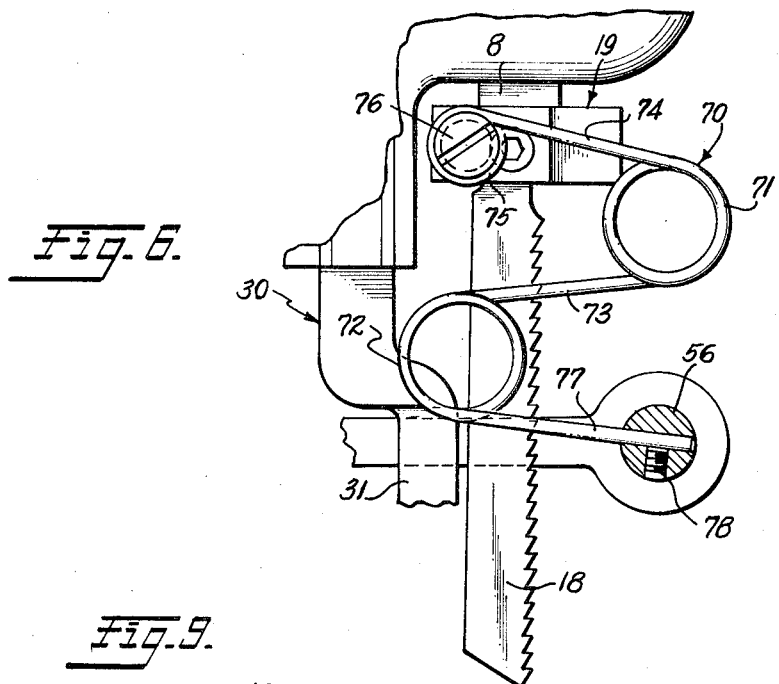
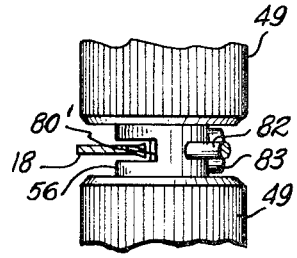
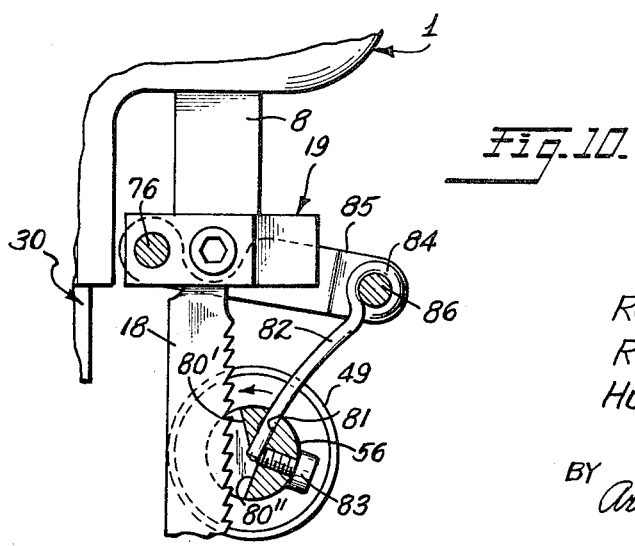
INVENTORS
ROBERT H. RILEY, JR.
RICHARD F. KOEN
HUBERT A. ZIEGLER
ALLEN E. HOLMES
BY Arnold & Roylance
ATTORNEYS ly Office 3,388,728
Patented June 18, 1968

3,388,728
PORTABLE POWER TOOLS
Robert H. Riley, Jr., Towson, Richard F. Koen, Lutherville, and Hubert A. Ziegler and Allen E. Holmes, Baltimore, Md.; said Holmes assignor to Martin-Marietta Corporation, New York, N.Y., a corporation of Maryland, and said Riley, Koen, and Ziegler assignors to The Black and Decker Manufacturing Company, Towson, Md., a corporation of Maryland
Filed Apr. 15, 1966, Ser. No. 542,855
15 Claims. (Cl. 143—68)

ABSTRACT OF THE DISCLOSURE

A self-feeding, minimum reaction power tool, such as a reciprocating saw, is provided wherein a work engaging device, such as a friction roller, is driven incrementally in timed relation to reciprocation of the saw blade or other tool element in such fashion that a positive increment of the feed motion is provided during each working stroke of the tool element. Driving means for the work engaging device is connected directly to the tool element holder and converts the reciprocatory motion of the tool element holder into incremental movement of the work engaging device.

---

The invention described herein was made in the performance of work under a NASA contract and is subject to the provisions of Section 305 of the National Aeronautics and Space Act of 1958, Public Law 85–568 (72 Stat. 435; 42 USC 2457).

This invention relates to power driven tools and more particularly to such tools having a self-feeding action so as to be capable of operating without requiring manual manipulation, or with only a minimum of manual manipulation. The invention is useful in all instances where it is desirable to have the tool carry out its function without requiring the operator to positively move the tool, and also finds particular application to low reaction power tools suitable for use under circumstances, such as those encountered during space travel, which make it undesirable for the tool to apply any substantial reaction force to the user.

The invention is applicable to that general class of power driven tools employing at least one driven tool element which, to accomplish its purpose, must be forcibly engaged with the work in a direction which is at an angle to the direction of driven movement of the tool element. The tool element can be, for example, a saw blade, an abrasive element, the movable cutter of a nibbler, etc. Various types of tool element motion are contemplated, including rotary motion in the case of rotary saws, and reciprocatory motion in the case of jigsaws and the like. A common example of tools which the invention is applicable is the usual jigsaw, in which the elongated saw blade is either driven in purely reciprocatory fashion, with the direction of travel lengthwise of the blade, or is moved in a more complex "arcuate" manner, as described in U.S. Patent 3,206,989, issued Sept. 21, 1965, to S. G. Enders. In this specification, "reciprocatory" will be employed to embrace the substantially reciprocatory motion characteristic of devices such as that disclosed in the patent just mentioned, as well as purely reciprocatory movement. The term "power driven" will be used to include not only mechanisms driven by an electric motor, for example, but also those driven by a manually operated mechanical movement.

Power driven tools of the type referred to have heretofore required that the operator not only guide or direct the tool manually, but also apply to the tool a force sufficient to cause the driven tool element to engage the work adequately for carrying out its purpose. Because of this, the use of such tools in many instances involves a significant labor cost which desirably could be reduced.

A primary object of the invention is accordingly to provide a self-feeding power tool which can be used without requiring manual manipulation for guiding and feeding the tool relative to the work.

The requirement that prior-art tools of this general type be manually guided and fed makes them impractical for use under circumstances such that there is little or no available resistance to the reaction forces developed during operation of the tool. For example, the usual hand-held portable jigsaw could not be used satisfactorily during travel in outer space because the substantially zero gravity conditions encountered in space travel render the human body freely movable, so that one attempting to operate the jigsaw could not move the saw relative to the work, or feed the work relative to the saw, without first grasping a hand-hold or otherwise anchoring his body relative to the spacecraft. Since requirements for the use of such tools during space travel are contemplated, there is an active demand for a power driven tool which will be practical in zero gravity and near zero gravity environments.

Another object of this invention is, therefore, to provide such a tool which is free or substantially free from the usual reaction forces and therefore satisfies the demand just described.

Another object is to devise a low reaction, self-feeding power driven reciprocatory saw, of hand-held portable configuration, suitable for use in zero gravity environments and other situations where manual manipulation is to be minimized.

A further object is to provide a portable power driven tool of the type described which is capable of successfully operating on the work without requiring an exteriorly applied positive force for resisting reaction forces normally occurring during operation of such tools.

Yet another object is to provide in such tools a positive feeding action generated from the power device which operates the tool and occurring in timed relation to the driven movement of the tool element in such fashion that the operator need not continuously force the tool against the work.

Stated in general terms, and recognizing that such tools necessarily include some form of frame or housing, a tool element holder, and power means arranged to drive the tool element holder, the invention employs a work engaging means, and force transmitting means connected between the work engaging means and the frame and operative to apply a force to the tool element in a direction to maintain the tool element in operative engagement with the work. In particularly advantageous embodiments of the invention, the work engaging means includes a friction roller, and the force transmitting means is operated from a driven part of the power tool, such as the tool element holder, to provide successive increments of rotation to the roller in a feeding direction during operation of the tool element.

In order that the manner in which the foregoing and other objects are achieved in accordance with the invention can be understood in detail, particularly advantageous embodiments thereof will be described with reference to the accompanying drawings, which form part of this specification, and wherein:

FIG. 1 is a front elevational view of a portion of a portable power driven jigsaw constructed in accordance with one embodiment of the invention;

FIG. 2 is a side elevational view of the device of FIG. 1 with some parts broken away for clarity of illustration;

FIG. 3 is a fragmentary rear elevational view taken on line 3—3, FIG. 2;

FIG. 4 is a transverse sectional view taken on line 4—4, FIG. 3;

FIG. 5 is a fragmentary sectional view taken on line 5—5, FIG. 2;

FIG. 6 is a semi-diagrammatic view illustrating the position assumed by a torsion spring, employed in the device of FIGS. 1–5, at the time the saw blade has reached its uppermost (as viewed) position;

FIG. 7 is a front elevational view of a portion of a jigsaw constructed in accordance with another embodiment of the invention;

FIG. 8 is a side elevational view of the device of FIG. 7;

FIG. 9 is a fragmentary view taken on line 9—9, FIG. 8; and

FIG. 10 is a sectional view taken on line 10—10, FIG. 7, but showing parts of the device in different relative positions than are seen in FIG. 7.

Referring to the drawings in detail, and first to FIG. 1, the hand-held portable jigsaw of this embodiment of the invention comprises a housing 1 which also constitutes the frame of the tool. The tool can be powered in any conventional fashion, as by a battery energized electric motor (not shown) carried by housing 1 and arranged to rotate a driven cylindrical element 2 suitably journalled on the housing and to which a bevel gear 3 is affixed. Meshed with gear 3 is a second bevel gear 4 rotatably supported by a stub shaft 5 and bearing sleeve 6. A crank pin 7 is carried by gear 4 and projects therefrom, parallel to the axis of shaft 5.

An elongated shaft 8 is slidably supported by a cylindrical guide bearing 9, the latter being loosely retained by the coaxial cylindrical recesses 10 in the two mating halves 1a and 1b of the housing, so that the bearing 9, and therefore shaft 8, can pivot about an axis transverse to the shaft. As seen in FIG. 2, crank pin 7 is slidably and rotatably accommodated in a roller 11 disposed in a cross yoke 12, the yoke being secured to the upper end of shaft 8 and extending transversely thereof. A guide member 13 is also secured to the upper end of shaft 8 and includes side flanges 14 each provided with an elongated guide slot 15 which extends generally longitudinally of shaft 8 but slants slightly downwardly and away from the shaft. Each half 1a, 1b of the housing carries a guide pin 16, FIG. 1, the two pins being coaxially aligned and projecting inwardly of the housing and toward each other in such fashion that each pin 16 extends through a different one of the slots 15.

The mechanism comprising crank pin 7, roller 11, yoke 12, guide member 13 and pins 16 is in accordance with aforementioned Patent 3,206,989. In operation, rotation of gear 4 and crank pin 7 causes shaft 8 to reciprocate longitudinally through bearing 9 while rocking about the transverse axis determined by the bearing.

The lower end of shaft 8 has an axially open socket 17, FIG. 2, to accommodate the end of saw blade 18, the blade being locked rigidly to the shaft in conventional fashion, as by a set screw. A mounting block 19 is rigidly secured to the lower end of shaft 8, as by set screws, and projects laterally from the shaft. Portion 20 of block 19 is located at the rear of the saw blade and includes flat side faces disposed each on a different side of the plane occupied by the saw blade when the blade is in place, the flat side faces being equally spaced from the saw blade. Block 19 also projects forwardly of shaft 8, providing a portion 21 which is cut away at each front corner to decrease weight and provide clearance for spring portions later described.

In this embodiment, the saw blade includes teeth 22 each having a cutting edge 23 extending transversely of the blade and facing toward shaft 8. Thus, the movement of the blade toward housing 1 constitutes the cutting stroke of the blade and it is during this movement that the toothed edge of the blade must be urged against the work.

Rearwardly of shaft 8, dependent side portions of housing 1 are recessed as indicated at 24, FIG. 2, and provided with transversely aligned elongated slots 25 which extend parallel to the direction of movement of the saw blade. A shaft 26 extends transversely of the housing and projects through slots 25, one end of the shaft being provided with an enlarged head and the other end being threaded to accept a clamping nut 27 equipped with an adjusting lever 28. The central portion of shaft 26 extends through and is fixed to the upper end of a straight portion 29 of a rigid strut 30, so that the strut depends from the shaft and lies in the same plane as the saw blade. The lower end of strut portion 29 is integrally joined in an S-shaped bend to a second straight portion 31. A foot structure 32, including parallel side members 33 rigidly interconnected by a transverse front member 34 and a transverse rear member 35, FIG. 5, is secured rigidly to the lower end of strut portion 31, the point of connection being at the center of member 35. Portion 31 is flat and of a thickness less than that of the kerf cut by the saw blade 18, so that portion 31 can trail the saw blade through the work.

As seen in FIG. 2, slots 25 are spaced rearwardly from shaft 8, and the S-shaped bend of strut 30 is so oriented and dimensioned that portion 31 is disposed immediately behind blade 18. Foot structure 32 projects forwardly from the strut, side members 33 lying each on a different side of the plane occupied by the saw blade and being spaced apart by a distance which is large as compared to the thickness of the blade. A roller 36 extends transversely between members 33 and is freely rotatable on a shaft 37 which has its ends fixed respectively in transversely aligned apertures in members 33. Roller 36 is spaced well ahead of the location of the saw blade 18 and, in addition, is provided with a centrally located peripheral groove 38 aligned with the saw blade to afford additional clearance. Adjacent rear member 35, a pair of rollers 39 are supported on side members 33 for free rotation, as by coaxially aligned stub shafts 40, rollers 39 being of such length and so disposed as to be located each on a different side of saw blade 18. Rollers 36 and 39 are all of the same diameter and, as seen in FIG. 2, the axes of rotation of the rollers are located in a common plane extending at right angles to strut 30.

Rearwardly of slots 25, the sides of housing 1 are provided with notches 41 providing flat side face portions 42 and flat front edges 43. Each notch 41 accommodates the upper end portion of a different one of two parallel rigid struts 44, the upper end portion of each strut 44 having an elongated longitudinally extending slot 45. Bolts 46 fixed to housing 1 project respectively through the slots 45, and wingnuts 47 cooperate with the bolts to clamp struts 44 rigidly in any of the adjusted positions allowed by cooperation of bolts 46 and slots 45. The lower ends of struts 44 are rigidly affixed to a flat presser foot 48 adapted to lie in sliding engagement with that face of the work piece W which is directed toward housing 1 when the tool is operatively disposed relative to the work.

The foot structure 32 constitutes part of work engaging means which also comprises two friction rollers 49 supported by a lever which is indicated generally at 50 and mounted on struts 44 for pivotal movement about an axis parallel to the axis of rotation of rollers 49. Lever 50 includes two elongated rigid side members 51 which are spaced apart, parallel, and rigidly interconnected at their rear or trailing ends by a U-shaped transverse member 52, the legs of member 52 each being rigidly secured to a different one of members 51, the base of the U of member 52 being spaced above members 51 and parallel to the plane in which those members lie. Each member 51 extends beside the inwardly directed face of a different one of struts 44. Pivotal mounting of lever 50 is achieved by transversely aligned pivot pins 53, FIGS. 2 and 4.

The front or leading ends of side members 51 are enlarged at 54 to define annular portions in which conventional antifriction roller bearings 55 are secured. The front ends of the side members are transversely aligned so that bearings 55 are coaxial. Bearings 55 support a shaft 56 for free rotation, and the end portions of the shaft project beyond the bearings. Rollers 49 are mounted on the end portions of shaft 56 by means of conventional one-way clutches 57, FIG. 1, with the clutches so arranged that the clutches are engaged, to turn rollers 49, whenever the shaft is turned in a clockwise direction, as viewed in FIG. 2, but are disengaged as to rotary movement of the shaft in a counterclockwise direction. Thus, any clockwise turning movement of shaft 56 is imparted to the rollers 49, but the shaft is simply free to turn relative to the rollers in the counterclockwise direction. A washer 58 is disposed between each roller 49 and the adjacent bearing 55, and the rollers are retained on the shaft by snap rings 59 engaged in transverse annular grooves in the end portions of the shaft, as seen in FIG. 1.

Lever 50 is yieldably biased, in a pivotal direction to urge rollers 49 against the work piece W, by adjustable biasing means indicated generally at 60 and including a lower cam block 61, a helical spring 62 engaged in compression between block 61 and presser foot 48, and upper cam block 63 disposed block 61 and the base portion of the U-shaped transverse member 52. A transversely spaced pair of guide posts 64 are secured rigidly to the base of member 52 and depend therefrom to extend through elongated guide notches 65, FIG. 4, in the sides of lower cam block 61. Posts 64 are mutually parallel, as are notches 65, so that block 61 can move relative to lever 50 in directions parallel to the plane of side members 51. Engagement of posts 64 in notches 65 restrains block 61 against rotation. Cam block 61 has an upwardly opening cam notch 66 which is centered between guide posts 64 and extends generally cylindrically, with the axis of its cylindrical surface parallel to side members 51, and with the edges of its cylindrical surface rounded. Upper cam block 63 has a convex cylindrical surface 67 capable of mating with the concave surface presented by notch 66, and is elongated in the direction of the axis of surface 67. The length of block 63 is slightly less than the space between posts 64.

Cam block 63 is mounted on the lower end of a screw member 68 which is engaged in a threaded bore through the center of the base portion of U-shaped member 52. The upper end of screw member 68 is provided with a lever 69, by which the screw member can be turned relative to member 52. The connection between cam block 63 and screw member 68 is such that the cam block turns as the screw is turned, and a quarter turn of the screw in one direction will turn block 63 from a first position in which it extends transversely of lever 50, and therefore engages the high points of lower cam block 61, to a second position, in which the cylindrical cam surfaces of he two cam blocks are in flush engagement with each other, as seen in FIG. 3. The upper surface of cam block 63 is flat and held in sliding engagement with the lower surface of the base of U-shaped member 52 by the action of spring 62. When block 63 is turned to its first position, the compressive force applied to spring 62 is greater and, assuming no work piece is yet present, the spring causes lever 50 to pivot in a clockwise direction, as viewed in FIG. 2, so that the planes of presser foot 48 and lever 50 converge in a direction toward rollers 49. When block 63 is turned to its second position, the effective height of the combination of the two cam blocks is decreased and the compressive force applied to spring 62 is reduced correspondingly.

In this embodiment, with rollers 49 constituting the driven elements of the work engaging means, the force transmitting means comprises two identical double torsion springs 70, each spring 70 including two multi-turn helical spring elements 71 and 72 which are integrally interconnected by the common, normally straight portion 73 which constitutes one end portion of both spring elements. The other straight end portion 74 of spring element 71 terminates in a circularly bent tip portion 75 which slidably embraces a smooth shank portion of a headed screw 76 engaged in a threaded bore in one side of rear portion 20 of block 19. As will be clear from a comparison of FIGS. 1 and 2, the two screws 76 oppose each other and are coaxially aligned, so engagement of tip portions 75 respectively with the screws 76 serves to connect the springs 70 to block 19 for free pivotal movement about an axis extending transversely of the housing and located behind the saw blade 18. The lengths of portions 73 and 74 are such that, with portions 74 extending forwardly from screws 76 and at right angles to shaft 8, spring elements 72 are spaced well to the rear of shaft 56. The remaining straight end portions 77 of spring elements 72 extend respectively through parallel diametrically extending bores in shaft 56, the tips of end portions 77 being locked in place by set screws 78, FIGS. 1 and 6. The dimensions of springs 70 are so chosen that, with shaft 8 in its mid-position, and with rollers 49 engaged with the work, springs 70 are essentially relaxed, as seen in FIG. 2.

Preparatory to explaining operation of the saw, the manner of placing the saw in its operative position with respect to the work will be described. Assume that the work piece W is a flat plate and that it has been provided with a starting hole H, FIG. 5. The saw is prepared for use by turning lever 69 to bring cam block 63 to a position in which it extends parallel to lever 50, so that the compressive force applied to spring 62 is decreased to a minimum value and the parts assume the positions apparent from FIG. 3. Lever 28 is turned to loosen clamping nut 27, allowing strut 30 to move to the lower limit afforded by slots 25. The saw is then manipulated to pass foot structure 32 through hole H, and strut 30 is now adjusted toward housing 1 until rollers 36 and 39 engage surface W' of the work piece, and the work piece is disposed between rollers 36 and 39, on the one hand, and friction rollers 49, on the other hand. For simplicity of explanation, it will be assumed that, as viewed in FIGS. 1 and 2, housing 1 is upright with respect to some common base to which the work is parallel, so that surface W' can be considered as the bottom surface and surface W'' as the top surface. After strut 30 has been moved upwardly to cause rollers 39 and 36 to engage surface W', lever 28 is turned to cause clamping nut 27 to fix strut 30 rigidly to the housing. Lever 69 is then turned to move cam block 63 downwardly to compress spring 62, causing lever 50 to swing clockwise, as viewed in FIG. 2, relative to the presser foot 48. The saw is now ready for operation.

Assume that shaft 8 is in its uppermost position, seen in FIG. 6, so that when the power source begins to operate, and bevel gear 4 begins to turn, shaft 8 will commence its downward stroke and block 19 will therefore move downwardly. Since shaft 56 cannot move downwardly, the downward stroke will cause springs 70, which are in tension at the start of the downward stroke, to progressively assume their relaxed conditions, attained at the mid-point of the stroke and illustrated in FIG. 2. As the downward movement continues beyond the midpoint, springs 70 are then progressively stressed in compression, causing the lower end portions 77 of the springs to move in generally pivotal fashion, counterclockwise as viewed in FIGS. 2 and 6. Since the tips of portions 77 are fixed to shaft 56 and extend diametrically with respect thereto, such movement of spring portions 77 causes a small counterclockwise turning movement of shaft 56. As to such movement, one-way clutches 57 are disengaged and the counterclockwise turning of shaft 56 cannot be imparted to rollers 49.

Shaft 8 now commences its upward stroke and, if the teeth 22 of the saw blade are in engagement with the work, this will be a cutting stroke. During upward travel of shaft 8, and therefore of block 19, springs 70 are first allowed to relax and return, at the mid-point of the stroke, to the position seen in FIG. 6. As soon as such movement occurs, the lower end portions 77 of springs 70 begin a generally pivotal movement, clockwise as viewed in FIG. 6. This movement tends to turn shaft 56 clockwise. As to clockwise movement of shaft 56, clutches 57 are engaged. Hence, the clockwise turning movement of shaft 56 causes a corresponding clockwise turning movement of rollers 49. Since rollers 49 are in rolling frictional engagement with the work piece W, the increment of clockwise rotation imparted to rollers 49 by springs 70 will result in a force tending to move the entire saw to the right, as viewed in FIGS. 2 and 6. This force can be considered as applied to the saw blade 18 via the shaft 8 and in a direction which is both transverse to the saw blade and directed to urge the toothed edge of the blade against the work piece. As the shaft 8 and saw blade 18 continue to reciprocate at a high rate each upward or cutting stroke of the saw blade is accompanied by a small clockwise increment of rotation of rollers 49, so that, if work piece W be considered as stationary, the entire saw will progress to the right, as viewed in FIGS. 2 and 6, and will traverse the work piece, with the toothed edge of the saw blade operatively urged against the work during each cutting stroke. A person operating the saw therefore need at most only guide the saw in its movement across the work piece.

All of the forces of reaction resulting from urging of the saw blade against the work are absorbed within the saw-and-work piece combination, in what might be termed "boot strap" fashion, so that no reaction force is imparted to the body of the person using the saw.

It should be noted that, during continued reciprocation of shaft 8, the roller shaft 56 does not rotate in the usual sense, but rather oscillates through a small acute angle, typically on the order of 5°–15°. Thus, the down stroke of the saw blade is accompanied by a small counterclockwise movement of shaft 56, and the next successive up stroke results in clockwise movement through the same angle.

In the embodiment of the invention seen in FIGS. 7–10, the double torsion springs of the embodiment just described are eliminated in favor of a single elongated spring element, so that the two friction rollers can be disposed closely adjacent to each other and the tendency for thin work pieces to be bent along a line between the rollers during sawing is minimized. In this embodiment, the basic power saw structure remains unchanged, and elements in FIGS. 7–10 which are the same as the corresponding elements in FIGS. 1–6 have simply been indicated by the same reference numerals.

As seen in FIG. 8, the portions of side members 51 of lever 50 which extend forwardly from pivot pins 53 are shorter and the bearings carried by end portions 54 of members 51 embrace the end portions of shaft 56. Friction rollers 49 are disposed inwardly of end portions 54, as seen in FIG. 7, and only a short central portion of shaft 56 is exposed between the two rollers. This central portion of the shaft is provided with a transverse slot 80, FIGS. 9 and 10, and a radial bore 81, FIG. 10, which opens into the bottom wall of slot 80. The width of slot 80 is substantially greater than the thickness of the toothed edge of the saw blade 18 and, since the axis of shaft 56 is immediately adjacent to the toothed edge of the saw blade, the blade passes through slot 80. Recognizing that shaft 10 oscillates, rather than turning in continuous rotation, the bottom wall of slot 80 can be considered as having a radial upper half 80′ and a chordal lower half 80″.

Bore 81 accommodates one end portion of an elongated spring member 82, the spring member being rigidly secured in the bore by a cap screw 83. The exposed head of the cap screw serves as a spacer between rollers 49, so that the rollers cannot shift significantly from their intended positions on shaft 56. The other end of spring member 82 has a circularly curved tip 84 lying in a plane at right angles to the axis of shaft 56.

In this embodiment, screws 76 each serve to pivotally attach to block 19 one end of one of two lever members 85, the lever members projecting forwardly in parallel fashion to a point in front of block 19, then being bent toward each other, and then again projecting forwardly, parallel and closely spaced, as seen in FIG. 7. Tip 84 of spring member 82 is disposed between the forward ends of lever members 85, and these ends of the lever members are connected by a bolt 86 and nut 87, the bolt having a plain shank portion extending through the tip 84 of spring member 82.

As in the embodiment earlier described, the rollers 49 are equipped with conventional one-way clutches engaged whenever shaft 56 moves clockwise and disengaged when the shaft moves counterclockwise. From FIGS. 8 and 10, it will be seen that shaft 56 is located rearwardly of the front end portions of lever members 85, so that spring member 82 projects radially from the shaft in straight line fashion forwardly and upwardly when shaft 8, and therefore block 19, are in their uppermost positions. Accordingly, when the down stroke of shaft 8 commences, spring member 82 is placed under generally longitudinal compression, and lever members 85 are forced to pivot counterclockwise about the axis afforded by screws 76. The lower end portion of spring member 82 is not free to pivot, since it is restrained in bore 81 and since clockwise turning of shaft 56 is resisted by friction between rollers 49 and the work piece, the one-way clutches for rollers 49 being engaged as to clockwise movement of the shafts. The length of lever members 85 cannot increase. Accordingly, spring member 82 is forced to bow progressively, in a sense making it concave toward the work. As the spring member bows, shaft 56 is forced to turn counterclockwise, under the influence of the spring force, this turning movement being allowed because the one-way clutches for rollers 49 are disengaged with regard to counterclockwise motion of the shaft. The parts thus assume the relative positions seen in FIG. 10 at the end of the down stroke.

During the following up stroke, which is again the cutting stroke for the saw blade, lever members 85 and spring member 82 return to the positions shown in FIG. 8, and the spring force built up by bowing of the spring member during the down stroke is now released to drive shaft 56 clockwise through the small rotational angle which was traversed in counterclockwise movement during the down stroke. Since the one-way clutches are engaged with respect to clockwise turning of shaft 56, rollers 49 are turned clockwise through the same angle as the shaft.

What is claimed is:
1. In a self-feeding power tool, the combination of frame means;
tool element holding means mounted on said frame means for reciprocatory movement such that a tool element carried by said holding means will be moved successively through a working stroke and a return stroke as said holding means reciprocates;
power means operatively coupled to said tool element holding means to reciprocate the same;
a movably mounted work engaging feed member carried by said frame means and constructed and arranged to driven to effect relative movement between the work and said frame means in a direction such as to urge the tool element operatively against the work; and
drive means for said work engaging feed member, said drive means being connected to said tool ele- ment holding means to be operated thereby as said holding means reciprocates, said drive means being connected to said feed member to drive the same to effect said relative movement incrementally in response to movement of said holding means, with each increment of said relative movement being accomplished during a working stroke of the tool element.

2. A power tool according to claim 1, wherein
said work engaging feed member has a circular work engaging surface, and
said drive means includes
a driven shaft, and
one-way clutch means operatively interconnecting said driven shaft and said feed member,
said drive means being operative to convert the reciprocatory movement of said tool element holding means into oscillatory movement of said shaft, and said one-way clutch means being operative to impart to said feed member only that portion of the oscillatory movement which is in a direction to cause said relative movement.

3. A power tool according to claim 2, wherein
said drive means comprises two torsion springs, one of said springs having one of its ends extending generally transverse to the direction of travel of said tool element holding means and fixed to said tool element holding means, the other of said springs having one of its ends extending generally transversely of said direction of travel and fixed to said driven shaft, the remaining ends of said springs being secured together.

4. A power tool according to claim 2, wherein
said drive means comprises torsion spring means having two straight end portions each lying in a plane transverse to said driven shaft, one of said end portions being attached to said tool element holding means, the other of said end portions being fixed rigidly to said shaft and extending laterally therefrom.

5. A power tool according to claim 2, wherein
said drive means comprises
an elongated spring member having one of its ends fixed to said driven shaft, said spring member projecting generally radially from said shaft in a direction such that the other end of said spring member is disposed generally between said shaft and said tool element holding means when the latter is at the limit of its travel away from the work, and
a link extending between said tool element holding means and said other end of said spring member and being pivotally connected both to said tool element holding means and to said other end of said spring member,
said spring member being significantly shorter than the distance between said driven shaft and said tool element holding means when the latter is at the limit of its travel away from the work.

6. A power tool according to claim 2, wherein
said drive means comprises spring means interposed between said tool element holding means and said driven shaft,
the power tool further comprises another work engaging feed member,
both of said feed members being rollers and said rollers being mounted on said driven shaft in spaced apart relation to each other, and
said spring means is connected to said driven shaft between said rollers.

7. A power tool according to claim 6, wherein
said spring means comprises two spring units each located on a different side of said tool element holding means.

8. A power tool according to claim 6, wherein
said spring means comprises one spring unit located in front of said tool element holding means.

9. A power tool according to claim 2, wherein
said drive means comprises a spring connected between said tool element holding means and said driven shaft, said spring being arranged to be resiliently distorted as said holding means approaches the limit of its travel toward the work and to relax as said holding means, having reached said limit, moves in the opposite direction, the connection between said spring and said driven shaft being such that the spring force released by relaxation of the spring, as said holding means moves in said opposite direction, acts in a direction which causes said clutch means to engage.

10. In a self-feeding power tool for operating on flat work, the combination of
frame means;
tool element holding means mounted on said frame means for reciprocatory movement such that a tool element carried by said holding means will be moved successively through a working stroke and a return stroke as said holding means reciprocates;
power means operatively coupled to said tool element holding means to reciprocate the same;
work engaging means comprising
a reaction roller support, a reaction roller rotatably mounted on said support, and means rigidly mounting said support on said frame means in a position such that said reaction roller can engage one surface of a flat work piece when the power tool is operatively positioned relative to the work piece; and
a drive roller support, a drive roller rotatably mounted on said drive roller support, and means mounting said drive roller support on said frame means in a position such that said drive roller can engage the other surface of the flat work in opposition to said reaction roller piece when the power tool is operatively positioned relative to the work piece; and
force transmitting means interconnecting said tool element holding means and said drive roller and operative to rotate said drive roller through a small angle, in a direction to maintain a tool element held by said holding means in operative engagement with the work piece, during the cutting stroke of each cycle of reciprocation of the tool element.

11. A power tool according to claim 10, wherein
said drive roller support is a lever, and said means mounting the same on said frame means defines a pivotal axis for said lever said axis being parallel to the work piece when the power tool is operatively positioned with respect thereto,
the power tool further comprising
adjustable means for urging said lever pivotally in a direction to force said drive roller against the work piece.

12. A power tool according to claim 10, wherein
said tool element holding means is adapted to hold a saw blade, and
said means mounting said reaction roller support on said frame means comprises a strut member having a thin flat portion extending generally parallel to the direction in which a saw blade extends when the blade is held by said holding means, said portion of said strut member being so positioned relative to said frame means as to extend through the saw kerf and trail the saw blade.

13. In a power tool of the type comprising a frame, a reciprocatory holding device for holding a tool element of the type which is to be forcibly engaged with the work in a direction which is at an angle to the direction of driven movement of the tool element, and power means carried by the frame and connected to the holding device to drive the same and thereby cause the tool element to be reciprocated through successive working and return storkes, the combination of work engaging means including a feed member;

means mounting said work engaging means on the frame in such manner that said feed member can be engaged with the work when the power tool is operatively disposed relative to the work;

means carried by the frame for urging said feed member into operative engagement with the work; and drive means connecting said feed member to the tool element holding device and operated by the holding device, as the same reciprocates, to actuate said feed member periodically to cause successive increments of relative movement between the work and the power tool, said increments of relative movement being in a direction such as to cause operative forcible engagement between the work and the tool element held by the holding device, said drive means being so constructed and arranged as to actuate said feed member to cause said relative movement only during a working stroke of the tool element.

14. A power tool according to claim 13 in which the holding device is adapted to hold a saw blade, and wherein said work engaging means includes two feed members, said feed members being rollers and both of said rollers being mounted on the same shaft;

said shaft extends transversely of the direction of travel of the saw blade held by the holding device, with said rollers being disposed each on a different side of the saw blade when the latter is held by the holding device; and said drive means includes a member connected to said shaft.

15. A power tool according to claim 14, wherein said rollers are spaced apart by a small distance such that said rollers will engage the work in areas close to the line of the cut to be made by the saw blade;

said shaft extends in front of the saw blade when the blade is held by the holding device; and said member of said drive means is connected to said shaft at a point which is centered between said rollers and lies in a common plane with the saw blade when the blade is held by the holding device.

References Cited

UNITED STATES PATENTS

| | | | |
|---|---|---|---|
| 129,285 | 7/1872 | Koch et al. | 83—427 |
| 902,656 | 11/1908 | Hend et al. | 143—75 |
| 2,200,746 | 5/1940 | Hoskwith | 30—275 |
| 2,917,088 | 12/1959 | Papworth. | |
| 3,010,352 | 11/1961 | Dunlap | 30—276 X |

DONALD R. SCHRAN, *Primary Examiner.*